US006238164B1

(12) United States Patent
Isaacs

(10) Patent No.: US 6,238,164 B1
(45) Date of Patent: May 29, 2001

(54) PIVOTING TRANSFER APPARATUS FOR TRANSFERRING MAIL BETWEEN TRAYS AND CARTRIDGES

(75) Inventor: Gerald A. Isaacs, Arlington, TX (US)

(73) Assignee: Siemens ElectroCom L.P., Arlington, TX (US)

( * ) Notice: Subject to any disclaimer, the term of this patent is extended or adjusted under 35 U.S.C. 154(b) by 0 days.

(21) Appl. No.: 09/437,394

(22) Filed: Nov. 10, 1999

Related U.S. Application Data

(63) Continuation-in-part of application No. 08/956,155, filed on Oct. 22, 1997, now abandoned.

(51) Int. Cl.[7] .............................. B65G 65/23; B65B 5/06

(52) U.S. Cl. ............................................ 414/405; 414/421

(58) Field of Search .................................... 414/403, 404, 414/405, 421, 758, 766, 768, 769, 771, 779, 783, 810, 816

(56) References Cited

U.S. PATENT DOCUMENTS 1,373,604 * 4/1921 Dyer .................................... 414/405
1,879,393 * 9/1932 Miller .................................. 414/404
2,164,222 * 6/1939 Rietfort ............................... 414/405
2,410,163 * 10/1946 Howard ............................... 414/405
4,095,707 * 6/1978 Kowtko ............................... 414/405
4,295,776 * 10/1981 Payne et al. ......................... 414/405
5,360,309 * 11/1994 Ishiguro ............................. 414/404
5,601,396 * 2/1997 Staub .................................. 414/810
5,772,383 * 6/1998 Kalika et al. .................... 414/421 X

* cited by examiner

*Primary Examiner*—Robert P. Olszewski
*Assistant Examiner*—Geraqld J. O'Connor
(74) *Attorney, Agent, or Firm*—Edward I. Jorgenson; Philip G. Meyers Intellectual Property Law, P.C.

(57) ABSTRACT

An apparatus for handling and transferring letter mail from and to different sized mail receptacles or containers such as cartridges and mail trays includes a support frame rotatably supporting a platform and intermediate transfer pan. The platform is adapted to receive a letter mail receptacle, and a clamp apparatus is provided to secure the container to the platform. A motor and coaxial shafts, coupled with a clutch, are drivingly engaged with the platform and the intermediate transfer pan. An elevator is provided to move the platform along a longitudinal axis and the platform is rotatable around an axis perpendicular to the longitudinal axis through the operation of the motor, coaxial shafts and clutch, the clutch selectively coupling the coaxial shafts. The platform and the intermediate transfer pan are rotated such that the letter mail originally located in a receptacle clamped on the platform is transferred to the intermediate transfer pan. After the receptacle is emptied of letter mail, it may be replaced with a different receptacle or container having different dimensions into which the letter mail is transferred from the intermediate transfer pan.

20 Claims, 7 Drawing Sheets

*FIG. 2*
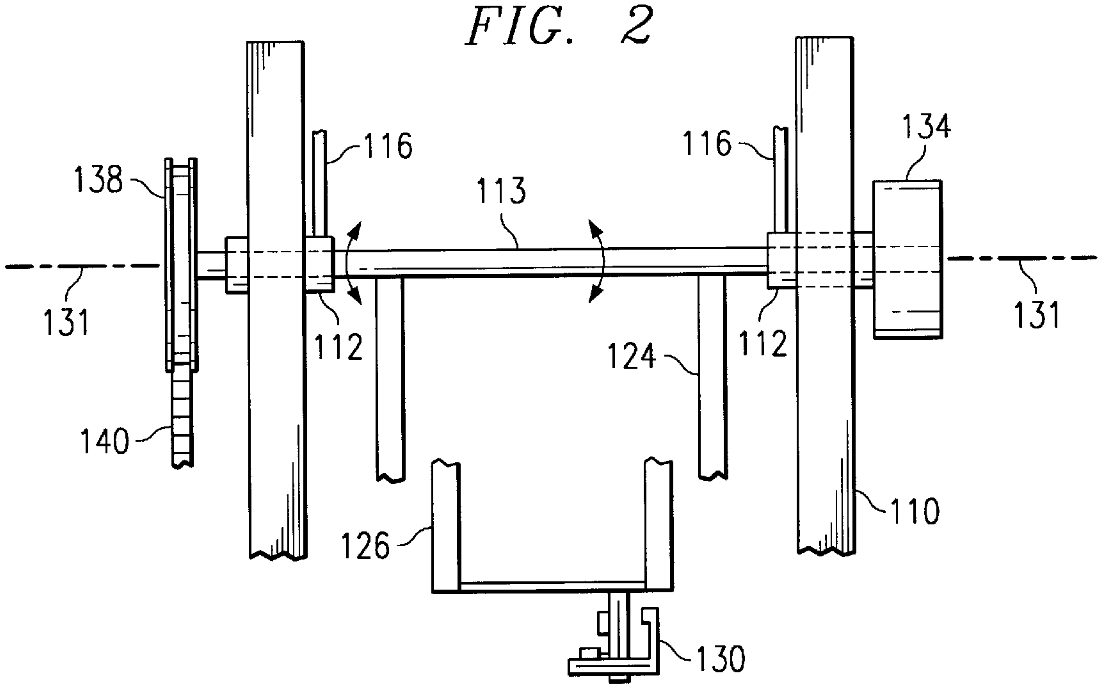
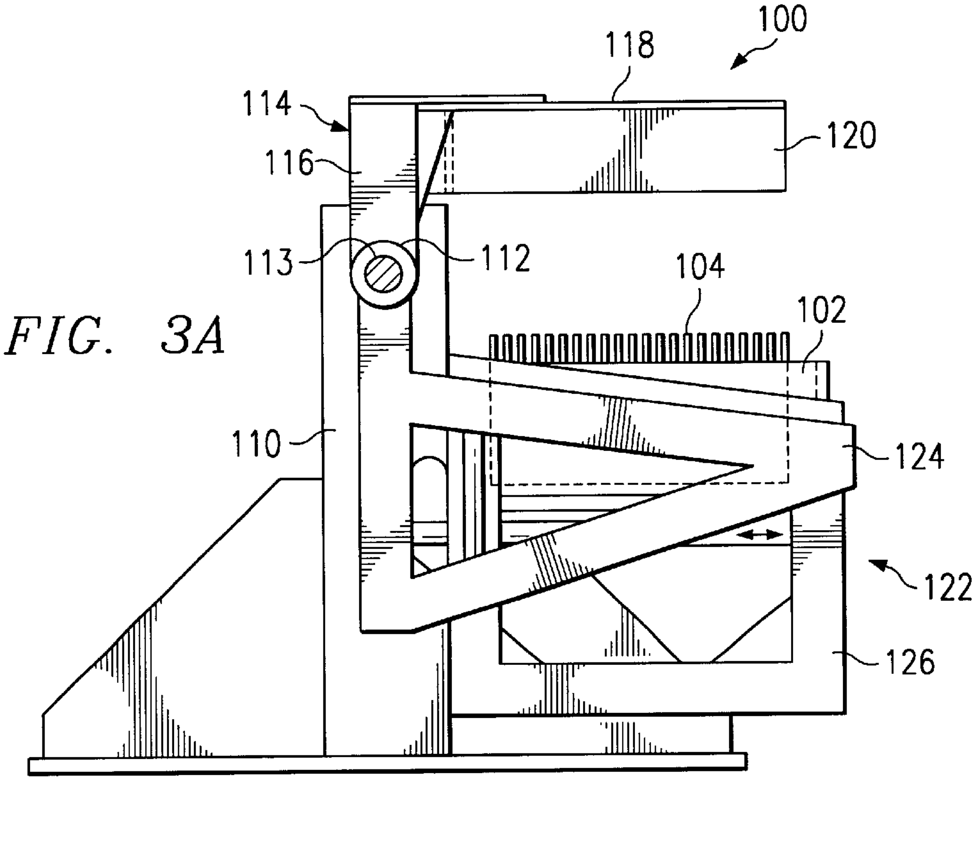
*FIG. 3A*

FIG. 3D
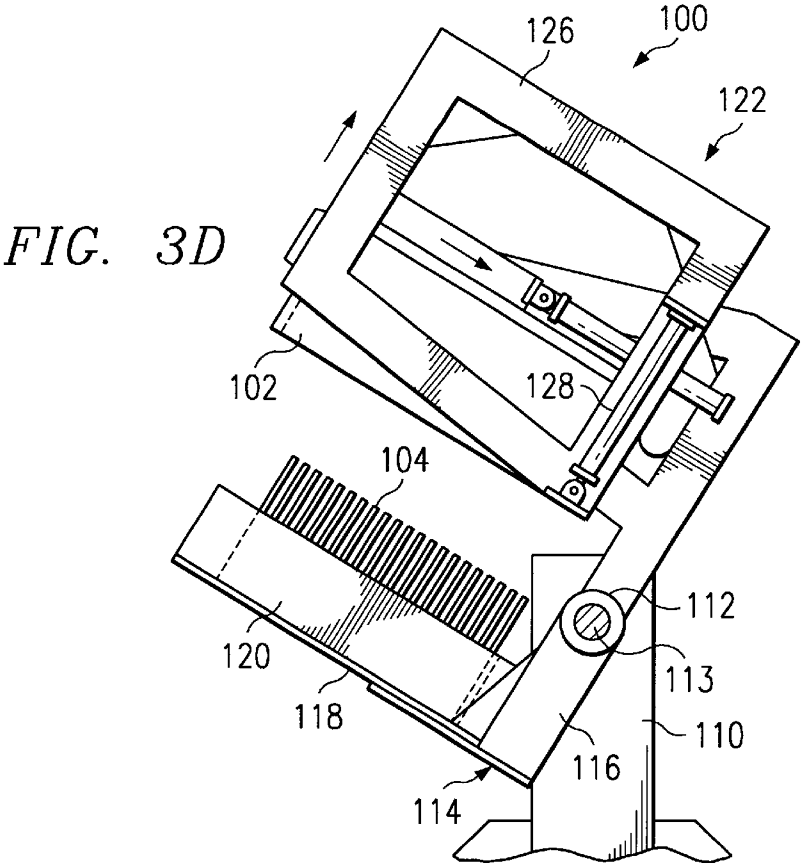
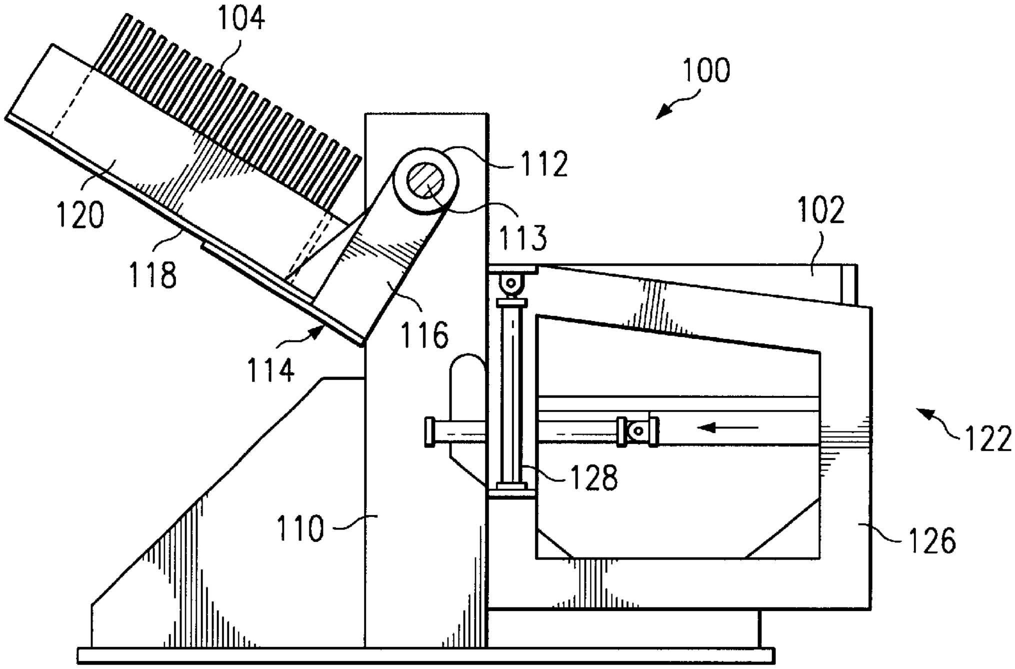
FIG. 3E

FIG. 3F
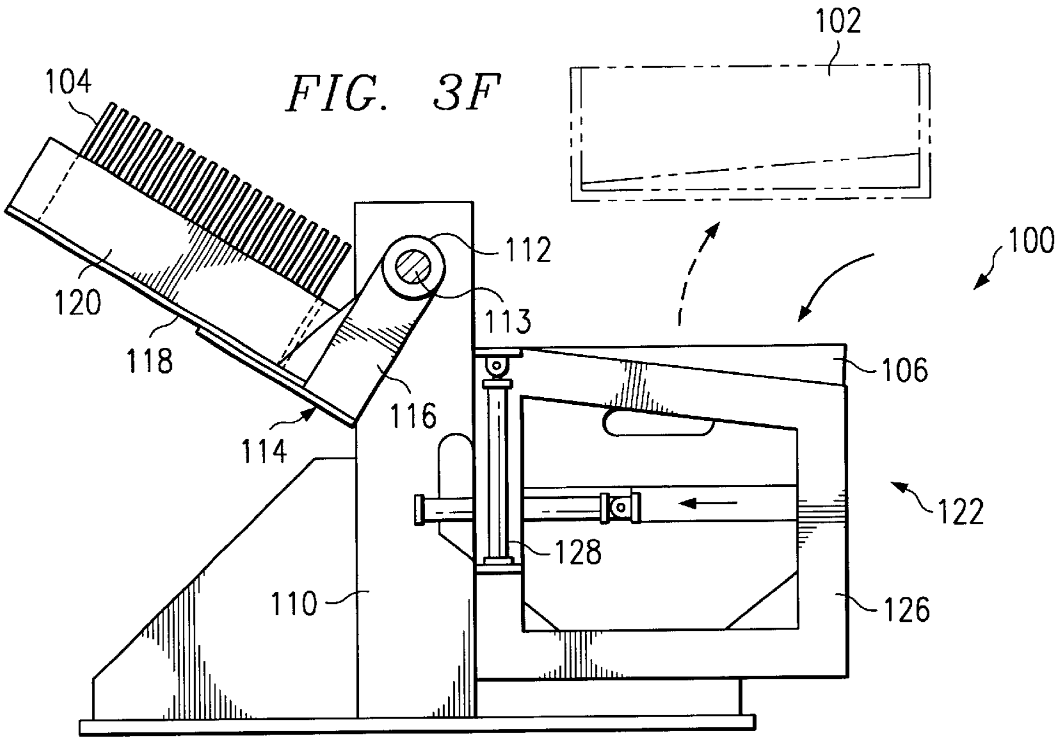
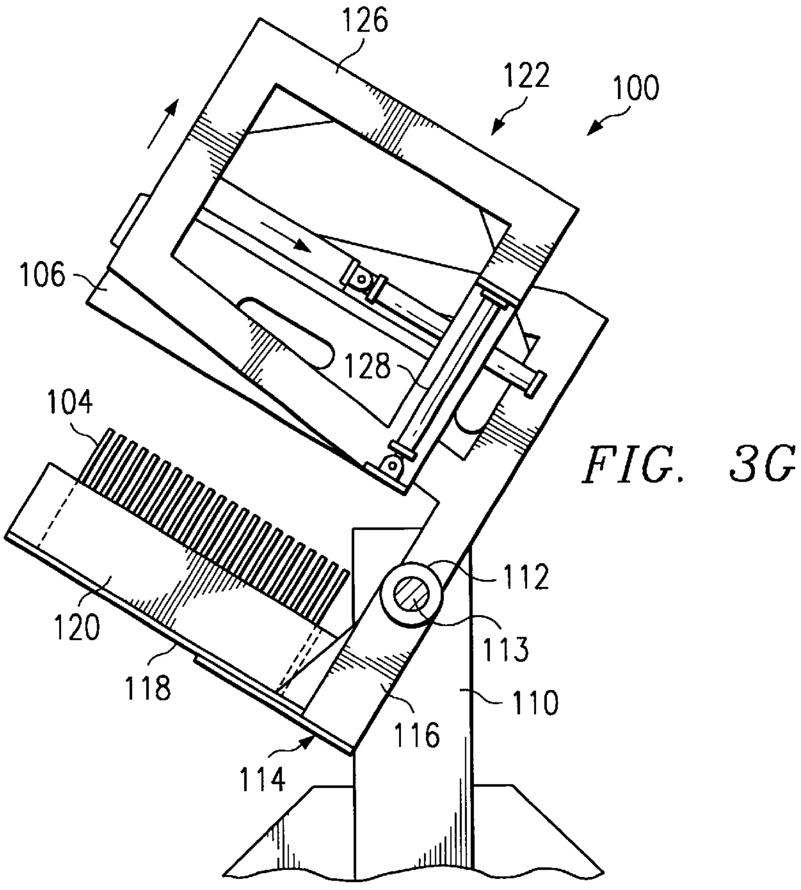
FIG. 3G

PIVOTING TRANSFER APPARATUS FOR TRANSFERRING MAIL BETWEEN TRAYS AND CARTRIDGES

RELATED APPLICATION

This application is a continuation-in-part of U.S. application Ser. No. 08/956,155, filed Oct. 22, 1997, now abandoned.

TECHNICAL FIELD

This invention relates to a mail tray loader transfer apparatus and, more particularly, to a tray loader uniquely adapted to transferring letter mail from a mail cartridge to a convention mail tray while maintaining the orientation and the sequential position of the letter mail as loaded into the tray.

BACKGROUND OF THE INVENTION

The United States Postal Service (USPS) uses a sorting system that arranges and positions letter mail into specially designed cartridges. The cartridges are designed to interface with the sorting system, and to maintain the orientation and position of the sorted letter mail. The cartridges are relatively expensive to manufacture. A typical cartridge contains components such as springs, levers and guides that interact with one another for the cartridge to function properly, retaining letter mail as loaded into the cartridge.

The sorting system is located at a central or regional processing center operated by the USPS. Approximately, 500 million pieces of letter mail a day may be sorted and positioned into the cartridges. Subsequent to the sorting process, the cartridges loaded with sorted letter mail are shipped from the regional processing center to other locations from which the mail is distributed to the population. A concern in transporting the cartridges from the regional processing center is the possibility that the cartridges may not be returned or if returned the cartridges may have been damaged during the transportation process. Another concern, is the relatively high transportation costs associated with moving the cartridges in part due to the weight of the cartridges, which are generally manufactured of metal.

Accordingly, there is a need for a tray loader or transfer apparatus that transfers letter mail located in a cartridge to a conventional lighter and less costly tray. Conventional letter mail trays may have different dimensions than a mail cartridge consequently any transfer apparatus should be able to handle both types of letter mail receptacles. Also there is a need to maintain the original orientation of the letter mail during the transfer process between the cartridge and the conventional tray. These and other needs are addressed by the tray loader of the present invention.

SUMMARY OF THE INVENTION

The invention provides apparatus for handling letter mail, specifically for transferring letter mail from one container such as a mail cartridge to a second receptacle such as a tray, while maintaining the orientation and order of the individual mail pieces during the transfer. The tray loader includes a pair of coaxial shafts for rotating a transfer platform and intermediate receiving pan. One of the coaxial shafts is motor driven and a clutch selectively couples the other shaft to the first shaft for simultaneous rotation of the shafts. An intermediate transfer pan for receiving letter mail from a first receptacle or container is mounted on the second shaft. A platform adapted to receive a letter mail receptacle is mounted on the first shaft. An elevator moves the platform along a first or longitudinal axis to position a mail cartridge or tray adjacent to the intermediate receiving pan and the platform and pan are rotated around a second axis substantially perpendicular to the first axis, enabling the transfer of letter mail from the mail cartridge to the intermediate receiving pan by gravity.

After the letter mail has been emptied from the cartridge into the intermediate receiving pan, the transfer platform is retracted and rotated to allow the cartridge to be replaced with a tray. The transfer platform is then elevated and rotated to position it adjacent to the intermediate receiving pan. The platform and receiving pan are then rotated back to allow the letter mail to transfer by gravity into the tray. Notably, the cartridge and tray typically have different dimensions. A clamping mechanism is provided to clamp the different sized containers to the platform during the process. The operation of the apparatus is controlled with a microprocessor or other machine controller using conventional technology.

BRIEF DESCRIPTION OF THE DRAWINGS

A more complete understanding of the present invention and the advantages thereof may be had by reference to the following Detailed Description when taken in conjunction with the accompanying Drawings wherein:

FIGS. 1(*a*) and 1(*b*) are perspective views of a mail cartridge and mail tray, respectively.

FIG. 2 is a partial front view of the tray loader of FIG. 1 illustrating coaxial roller shafts utilized in the invention;

FIGS. 3A–3J are side views of the tray loader in various positions during a transfer process, with the supporting frame not shown in FIGS. 3B–3J.

DETAILED DESCRIPTION

Figure 1:
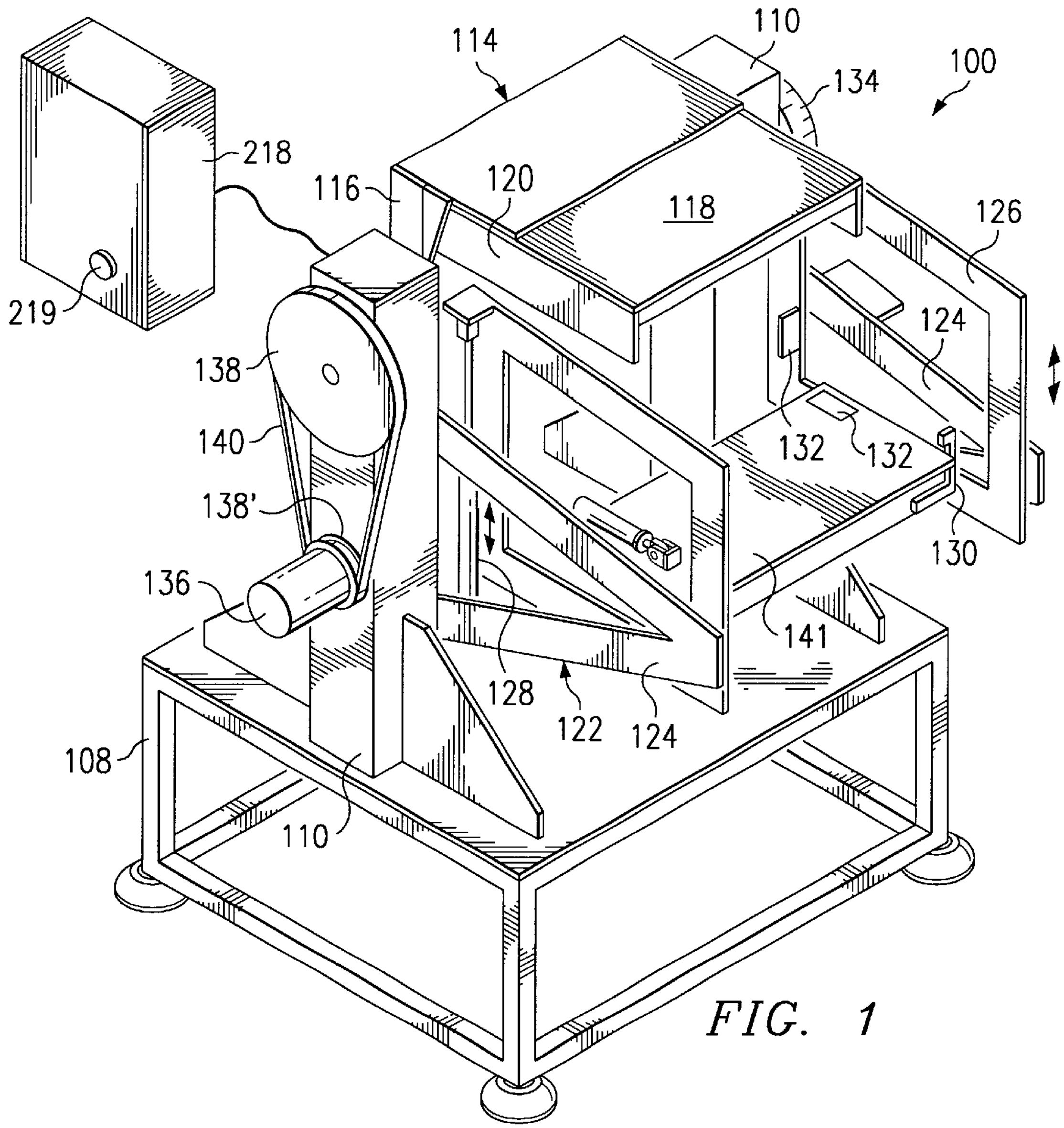
FIG. 1 is a perspective view of one embodiment of the tray loader of the present invention.
Figure 1A:
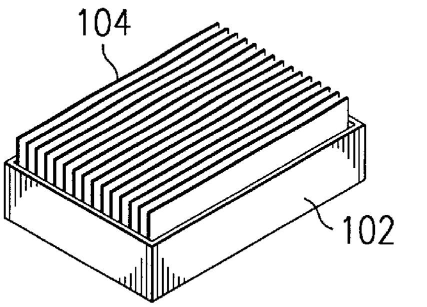
Figure 1B:
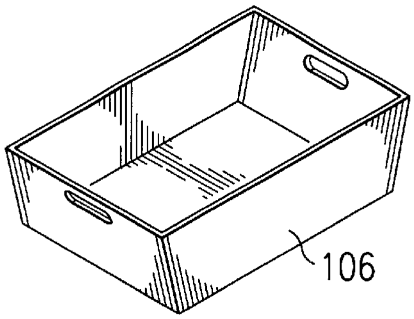

Referring to the Drawings, wherein like numerals represent like parts throughout the several views, there is disclosed a tray loader 100 in accordance with the present invention.

Figure 4:
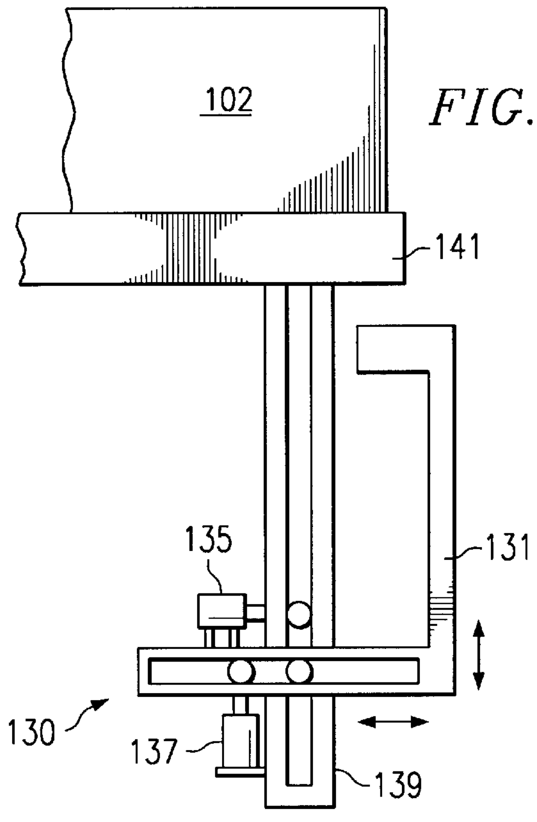
FIG. 4 is a partial exploded view of the front of the tray loader of FIG. 1 illustrating retractable clamps suitable for use in connection with the invention.

Referring to FIGS. 1, 2 and 4 the tray loader 100 of the invention includes a support frame 108 having a pair of columns 110 extending upwardly from the support frame. Extending between columns 110 are coaxial first and second roller shafts, 113 and 112 respectively. (FIG. 2). The coaxial roller shafts 112 and 113 are rotatably supported by two concentric pairs of bearings (not shown), two concentric bearings being located within each of the columns 110.

First coaxial shaft 113 is driven by a motor 136 through a belt 140 and sprockets 138 and 138' which are operatively coupled to first coaxial shaft 113 and motor 136 respectively. A clutch 134 is provided to selectively couple second coaxial shaft 112 to first shaft 113 during the transfer process as described in greater detail below. Alternatively, a direct drive may be used, in which case motor 136 would typically be connected to coaxial shaft 113 through a gear reducer (not shown).

An intermediate transfer pan 114 includes a pair of arms 116, connected at each end to a corresponding end of the second coaxial shaft 112. The opposite end of each arm 116 is connected to a transfer plate 118 that has side panels 120 extending therefrom. The transfer plate 118 and the side panels 120 extend out and from the pair of arms 116 and are configured to accept letter mail 104 transferred from the cartridge 102.

A transfer platform 122 includes a frame 124 that extends from and is rotatably mounted to the first coaxial shaft 113. The transfer platform 122 further includes a support elevator 126, including transfer receiver 141 mounted to move within the frame 124. The transfer platform 122 accepts either a cartridge 102 or a tray 106 loaded onto the transfer platform by a conveyor (not shown) or other conventional means. In operation, cartridges 102 and trays 106 are alternately loaded onto the transfer platform 122.

In the illustrated embodiment, a support elevator 126 is raised and lowered within the frame 124 with a pneumatic cylinder 128. The cylinder 128 may be hydraulic or pneumatic and is actuated by controller 218 which controls the timing and sequencing of the operation of the tray loader 100 during the transfer process. When a mail receiving receptacle such as at cartridge 102 or tray 106 is loaded onto transfer platform 122, cylinder 128 is actuated to raise the support platform to position the cartridge or tray adjacent to the transfer pan 114. Controller 218 is equipped with a “kill switch” 219 which enables an operator to stop the operation of loader 100 in the event that the unit must be shut down due to a jam or other interruption.

The transfer platform 122 further includes retractable holding clamp assemblies 130 (FIG. 4) that secure a cartridge 102 or tray 106 to the transfer platform during the transfer operation. The holding clamp assemblies 130 may be operated by one or more hydraulic or pneumatic cylinders and are controlled by controller 218. In one embodiment, the clamp assemblies 130 are designed to hook over the edges of cartridge 102, securing the cartridge in the platform during the transfer operation. During the transfer operation, the clamp assemblies 130 also serve to secure a tray 106 in position in the platform 122. The mail cartridge 102 typically does not have the same dimensions as a mail tray 106. However, a conventional mail tray 106 is normally relatively light and flexible, typically being formed from cardboard or plastic. Thus, relatively little clamping force is required to hold the tray in position and clamp assemblies 130 have been demonstrated that hold the tray in position by merely pressing against the sides of the tray 106, rather than clamping the tray tightly in place. Thus, a tray 106 is not required to have the same geometry as a cartridge 102 and the tray loader of the invention has the capability of handling mail receptacles (trays and cartridges) having a range of different geometries during the transfer process.

Referring specifically to FIG. 4, clamp assembly 130 includes a sliding clamp, 131 mounted on track 139 for movement along the track in a vertical direction upon actuation of cylinder 137. Horizontal movement of clamp 131 is controlled by cylinder 135, which, as will be appreciated, moves the clamp laterally to clamp a cartridge 102 or tray 106 in position on transfer receiver 141 during the transfer process. Clamp assemblies 130 are controlled and actuated by controller 218. Clamping assemblies may, for example, be actuated by controller 218 upon receipt of a signal from sensor 132 indicating that a tray has been positioned on transfer receiver 141.

One or more sensors 132 are provided to detect that a cartridge or tray is in position and/or that holding clamp assemblies 130 have secured either the cartridge 102 or the tray 106 in the transfer platform 122. Sensors 132 may be connected to or adjacent to the support elevator 126 and monitored by the controller 218. A sensor 132 may be provided to detect a defective cartridge 102 or tray 106, and upon detection the defective cartridge or tray is unloaded from the tray loader instead of proceeding with the transfer process. Sensor or sensors 132 may be contact sensors, proximity sensors, or optical sensors depending upon the particular application and location of the sensor.

Referring to FIG. 2, there is shown a front view of the tray loader 100 further illustrating coaxial roller shafts 112 and 113. The clutch 134 selectively couples shafts 112 and 113 in response to control signals from the controller 218. Motor 136 is also controlled by the controller 218. As illustrated, shaft 112 is not continuous across the length of shaft 113 but is part of an assembly including, transfer pan 114, transfer plate 118, transfer arms 116, side panels 120 and shaft 112 which are all welded, bolted or otherwise fastened together so as to move as a single rotational unit. This configuration simplifies the operation of the tray loader 100.

Referring now to FIGS. 3A–3J, side views of the tray loader in various positions during the transfer process are presented. Frame 124 is not shown in FIGS. 3B–3J for the purpose of clarity in illustrating the operation of the tray loader 100. The tray loader 100 is illustrated in a beginning position (FIG. 3A) and a final position (FIG. 3J) and various intermediate positions (FIGS. 3B–3I) occurring during the tray loading sequence.

Referring to FIG. 3A, there is illustrated the tray loader 100 with cartridge 102 containing letter mail 104 positioned in transfer platform 122 at the beginning position of the transfer process. The cartridge 102 is secured in place within the support elevator 126 by retractable clamping assemblies 130 (FIG. 4). As illustrated, the support elevator 126 is located at its bottom position within the frame 124. The transfer plate 118 of intermediate transfer pan 114 is positioned substantially parallel to and directly above the support elevator 126. Sensor 132 (FIG. 1) generates and transmits a secure signal to the controller 218 when the cartridge 102 has been secured to the support elevator 126. The controller, in turn initiates the transfer process.

Figure 3B:
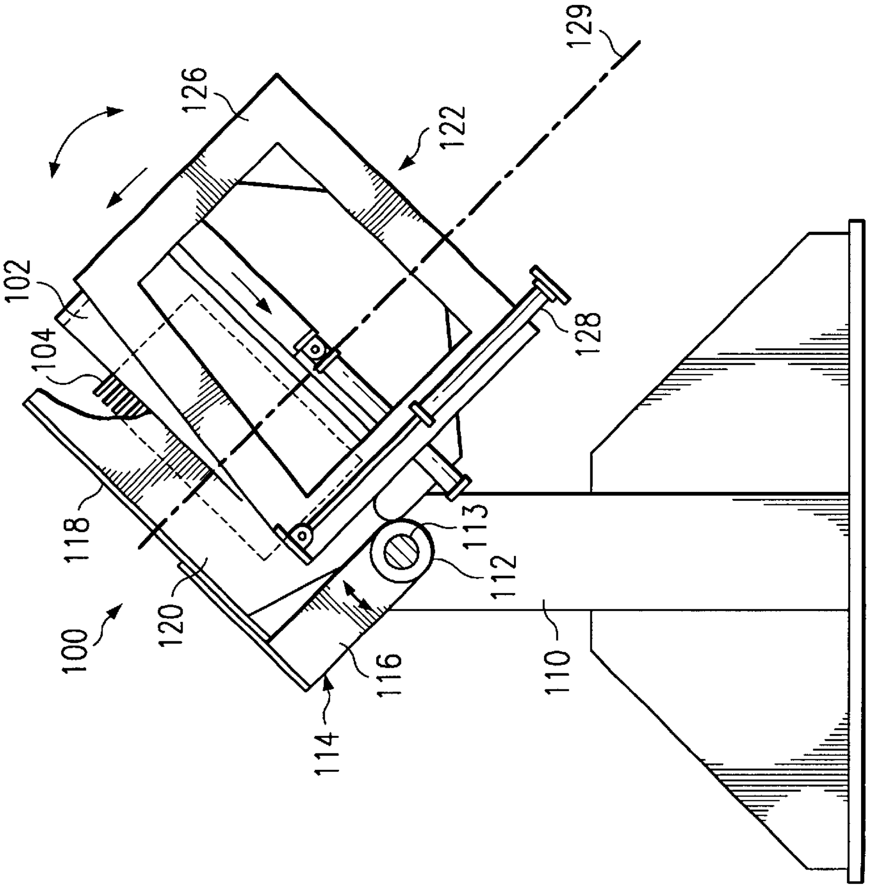

Turning now to FIG. 3B, the tray loader 100 is shown in a second, sequential position. Cylinder 128 has been actuated by controller 218 to lift support elevator 126 within frame 124 such that cartridge 102 has been positioned closer to intermediate transfer pan 114 to assist in keeping the letter mail from shifting. Controller 218 has engaged motor 136 and clutch 134 to rotate coaxial shafts 112 and 113 thereby rotating transfer platform 122 and transfer pan 114 as shown. As illustrated, the platform is moveable along a longitudinal axis 129 and rotatable about a second axis 131 (FIG. 2) perpendicular to the longitudinal axis.

Figure 3C:
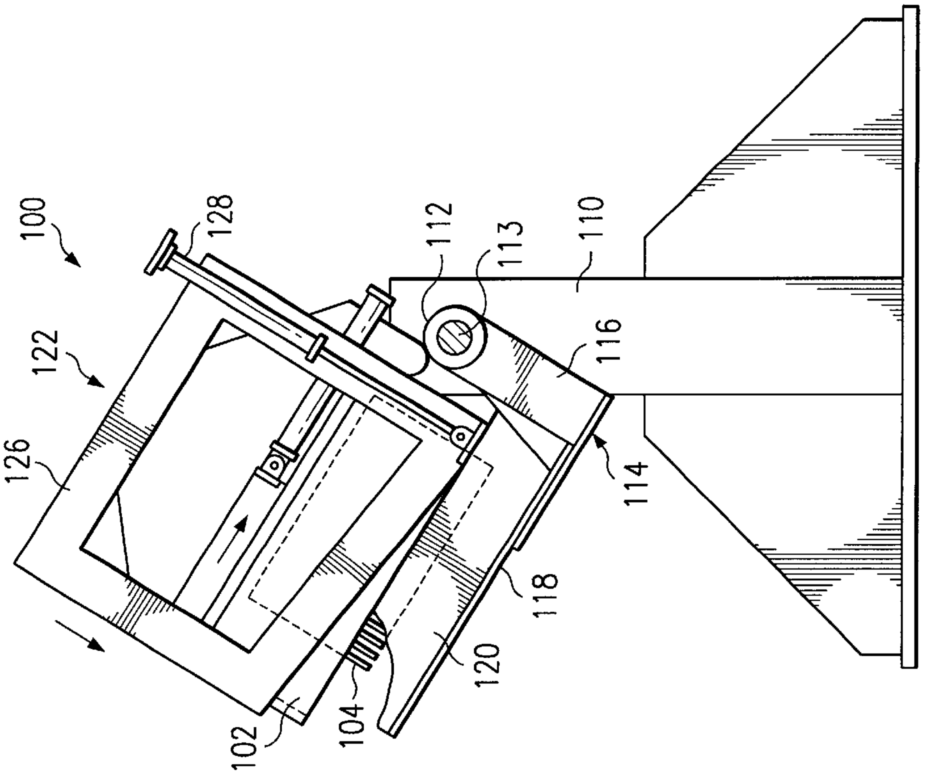

Referring to FIG. 3C, the transfer platform 122 and intermediate transfer pan 114 are shown rotated to an inverted position, approximately 150 degrees from horizontal. The letter mail 104 has been transferred by gravity from cartridge 102 to intermediate transfer pan 114 by action of gravity. The sequential arrangement of the letter mail 104 located in the intermediate transfer pan 114 remains the same as it was in the cartridge 102. In one embodiment of the invention, it takes approximately 1 to 2 seconds for the tray loader 100 to move from the position illustrate in FIG. 3A to the position shown in FIG. 3C.

Referring to FIG. 3D, there is illustrated the empty cartridge 102 disengaged from the intermediate transfer pan 114 which now contains the letter mail 104. The air cylinder 128 is deactuated such that the support elevator 126 and the cartridge 102 are moved away from the intermediate transfer pan 114. The sequential arrangement of the letter mail 104 located in the intermediate transfer pan 114 is not disturbed during this step of the process. The clutch 134 is disengaged to de-couple coaxial shaft 112 from shaft 113, thereby allowing transfer platform 122 to move independently of intermediate transfer pan 114.

Motor 136 is engaged to rotate coaxial shaft 113, returning transfer platform 122 to the position illustrated in FIG. 3E. After rotation of the transfer platform 122, holding clamp assemblies 130 release the cartridge 102. The cartridge 102 is removed from the transform platform by any conventional means, for example a cylinder operated arm or extractor (not shown). The transfer platform 122 is now positioned in a loading position, ready to receive an empty mail tray 106. In one embodiment, the empty cartridge 102 is simply pushed off of the transfer platform 122 onto a receiving or transfer conveyor, such as an inclined roller conveyor, (not shown) by an empty tray 106 loaded onto the transfer platform.

Referring to FIG. 3F, there is illustrated an empty tray 106 positioned in the support elevator 126. The tray 106 is secured into place by the actuation of the holding clamp assemblies 130 by the controller 218. The now empty cartridge 102 has been moved off the tray loader 100.

Referring to FIG. 3G, there is illustrated the transfer platform 122 rotated to a position above the letter mail 104 located in the intermediate transfer pan 114. The intermediate transfer pan 114 is still positioned at approximately 150 degrees from horizontal. The clutch 134 is not engaged with concentric shaft 112 and intermediate transfer pan assembly 114 during the rotation of the transfer platform 122 during this step of the transfer process. As discussed earlier, the transfer platform 122 will not be rotated unless the tray 106 is secured to the support elevator 126 by actuation of the holding clamp assemblies 130.

Figure 3H:
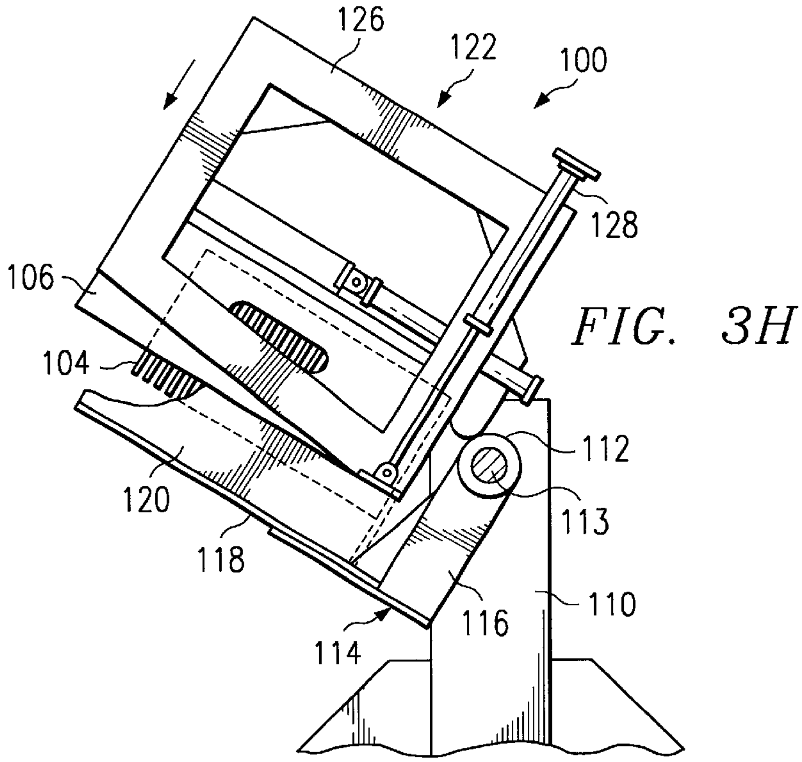
Figure 3I:
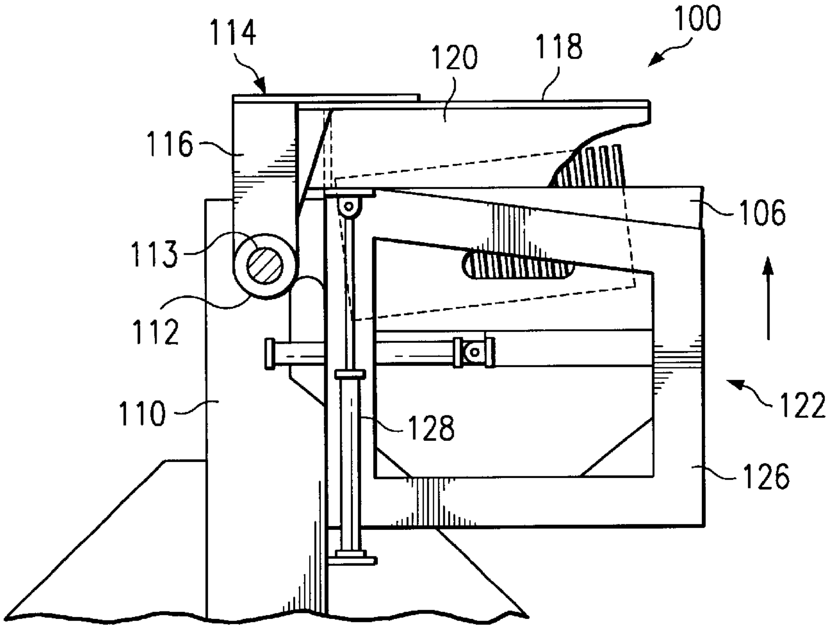

Referring to FIG. 3H, there is illustrated the tray 106 in contact with the intermediate transfer pan 114. To achieve this position, the air cylinder 128 is actuated by the controller 218 to move the support elevator 126 within the frame 124 to an extended position, i.e. close to the transfer platform. The transfer platform 122 does not rotate while the support elevator 126 is extended within the frame 124. Clutch 134 is then actuated to couple coaxial shafts 112 and 113 and motor 136 is engaged to rotate transfer platform 122 and the intermediate transfer pan 114 to the position shown in FIG. 3I. Intermediate transfer pan 114 remains substantially in with the tray 106 during the rotation. During the rotation, letter mail previously deposited in intermediate transfer pan 114, moves a short distance by gravity into tray 106.

Figure 3J:
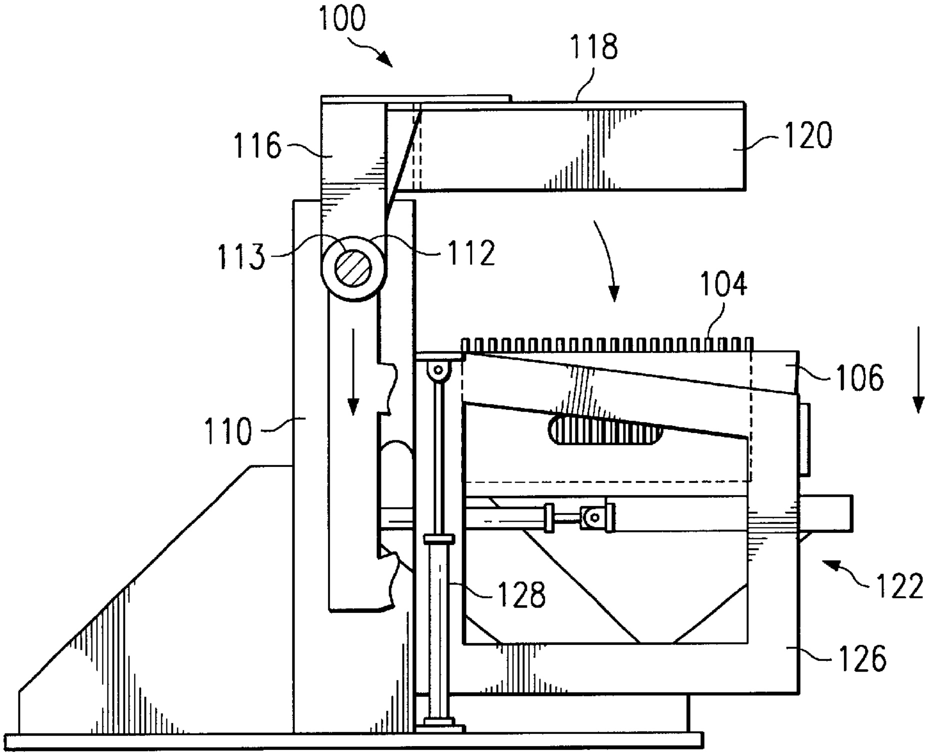

Air cylinder 128 is deactuated by the controller 218 such that the tray 106 and the support elevator 126 are lowered within the frame 124 to the position illustrated in FIG. 3J. In this position, where the tray 106 loaded with letter mail 104 may be moved from the tray loader 100 by conventional means such as a cylinder powered extractor or ram onto a transfer conveyor (not shown). Alternatively, the tray 106 loaded with letter mail may simply be pushed from the transfer platform onto the transfer conveyor by the next loaded mail cartridge 102.

Thereafter, the transfer process illustrated by FIGS. 3A through 3J may be repeated. In one embodiment, the throughput of the tray loader 100 has been demonstrated to be approximately six completed transfers per minute.

As will be appreciated, the operation of the various components of the tray loader 100 such as the motor 136, clutch 134, support elevator cylinder 128 and clamping assemblies 130 may be controlled through the use of conventional limit switches, sensors and controller 218 as is known to those skilled in the art.

While the present invention has been described with reference to the illustrated embodiment, it is not intended to limit the invention but, on the contrary, it is intended to cover such alternatives, modifications and equivalents as may be included in the spirit and scope of the invention as defined in the following claims.

What is claimed is:

1. A transfer apparatus for transferring letter mail from a mail receiving receptacle comprising:

a support frame;

first and second coaxial shafts mounted on the support frame, the first and second shafts rotatable in the support frame;

a motor coupled to the first shaft, the motor rotating the first shaft upon actuation thereof;

a clutch, the clutch selectively coupling the first and second shafts for rotation of the second shaft with the first shaft;

a platform connected to the first shaft and rotatable relative to the support frame, the platform being adapted to receive mail receptacles having varying dimensions;

a transfer pan connected to the second shaft, the transfer pan rotatable with the platform relative to the support frame, the transfer pan being configured to receive letter mail from a mail receptacle positioned on the platform upon rotation of the platform and transfer pan.

2. The transfer apparatus of claim 1 wherein the transfer pan further comprises a pair of arms coupled to the second shaft, and wherein the transfer pan, arms and second shaft are connected so as to move as a single unit.

3. The transfer apparatus of claim 1 wherein the platform further comprises a support elevator, the support elevator positioning the platform relative to the transfer pan.

4. The transfer apparatus of claim 1 wherein the platform further comprises a clamp coupled to the platform, the clamp securing a mail receiving receptacle on the platform.

5. The transfer apparatus of claim 1 further comprising a sensor coupled to the platform for sensing a mail receiving receptacle secured on the platform.

6. The transfer apparatus of claim 5 further comprising a controller and wherein the sensor signals the controller to indicate a mail receiving receptacle secured on the platform.

7. The transfer apparatus of claim 6 wherein the support elevator further comprises a pneumatic cylinder for raising the elevator.

8. The transfer apparatus of claim 7 wherein the pneumatic cylinder is actuated by the controller.

9. A transfer apparatus for transferring letter mail between mail receiving containers comprising:

a support frame;

a first shaft mounted for rotation on the support frame;

a platform connected to the first shaft for supporting a mail receiving container, the platform being rotatable in the support frame upon rotation of the first shaft;

a second shaft mounted on the support frame, the second shaft being coaxial with the first shaft and mounted for rotation in the support frame;

a transfer pan connected to the second shaft for receiving mail from a first container, the transfer pan being rotatable in the support frame upon rotation of the second shaft;

a motor coupled to the first shaft for driving rotation of the first shaft and platform upon actuation thereof;

a clutch for selectively coupling the first and second coaxial shafts for simultaneous rotation of the first and second shafts whereby the platform and transfer pan are simultaneously rotated;

a sensor for detecting the presence of a mail receiving container on the platform; and a controller for engaging the motor and clutch upon receiving a signal from the sensor, thereby simultaneously rotating the platform and transfer pan whereupon mail a mail receiving container positioned on the platform is transferred to the transfer pan.

10. The transfer apparatus of claim 9 wherein the platform further comprises a support elevator, the elevator positioning the platform relative to the transfer pan.

11. The apparatus of claim 10 further comprising a cylinder for lifting the support elevator.

12. The apparatus of claim 9 further comprising a clamp for securing a mail receiving container on the platform.

13. The apparatus of claim 12 further comprising a sensor, the sensor sensing a mail receiving receptacle secured on the platform.

14. A transfer apparatus for transferring letter mail from a mail receiving receptacle comprising:

a support frame;

a platform mounted for rotation on the support frame, the platform mounted for rotation about an axis from a first position to an inverted position, the platform adapted to support mail receptacles of varying sizes in the first position;

a transfer pan mounted on the support frame, the transfer pan mounted for simultaneous rotation with the platform around the axis from a first position above the platform to an inverted position below the platform, the transfer pan adapted to receive mail from a mail receptacle positioned on the platform when the transfer pan and platform are inverted;

a motor coupled to the platform for rotating the platform upon actuation thereof;

a clutch selectively coupling the platform and transfer pan for rotation of the transfer pan with the platform to an inverted position; and whereby, upon simultaneous rotation of the platform and transfer pan from a first position to an inverted position letter mail in a receptacle positioned on the platform is transferred to the transfer pan.

15. The transfer apparatus of claim 14 further comprising first and second coaxial shafts mounted on the frame and wherein the platform is attached to the first coaxial shaft and the transfer pan is mounted to the second coaxial shaft for simultaneous rotation and wherein the clutch selectively couples the first and second shafts for simultaneous rotation thereof.

16. The transfer apparatus of claim 15 wherein the motor is connected to the first shaft for driving rotation thereof.

17. The transfer apparatus of claim 14 wherein the platform further comprises a support elevator, the elevator positioning the platform relative to the transfer pan.

18. The apparatus of claim 17 further comprising a cylinder for lifting the support elevator.

19. The apparatus of claim 14 further comprising a clamp for securing a mail receiving container on the platform.

20. The apparatus of claim 14 further comprising a sensor, the sensor sensing a mail receiving receptacle secured on the platform.

* * * * *